United States Patent [19]
Iida et al.

[11] Patent Number: 4,879,618
[45] Date of Patent: Nov. 7, 1989

[54] WIND BREAKING ASSEMBLY FOR A MAGNETIC HEAD

[75] Inventors: Muneo Iida; Masanobu Honda; Katsumi Kawamura; Hiroshi Daito; Yoshihiko Miyake, all of Odawara; Shouichi Setone, Ebina; Hatsuo Takahashi, Chigasaki; Michihiro Nakanishi, Odawara, all of Japan

[73] Assignee: Hitachi, Ltd., Tokyo, Japan

[21] Appl. No.: 248,377

[22] Filed: Sep. 23, 1988

Related U.S. Application Data

[63] Continuation of Ser. No. 943,909, Dec. 19, 1986, abandoned.

[30] Foreign Application Priority Data

Dec. 23, 1985 [JP] Japan .................................. 60-287707

[51] Int. Cl.$^4$ ................................................ G11B 5/55
[52] U.S. Cl. ..................................... 360/106; 360/128; 360/98.01
[58] Field of Search ................ 360/102, 103, 104, 106, 360/130.34, 128, 98.01

[56] References Cited

U.S. PATENT DOCUMENTS

| | | | |
|---|---|---|---|
| 2,972,738 | 2/1961 | Sliter | 360/103 |
| 3,713,121 | 5/1970 | Fasano et al. | 360/103 |
| 4,415,941 | 11/1983 | Gibeau et al. | 360/98 X |
| 4,476,404 | 10/1984 | Bygdnes | 360/105 X |
| 4,605,977 | 8/1986 | Matthews | 360/102 X |

FOREIGN PATENT DOCUMENTS

| | | | |
|---|---|---|---|
| 0025826 | 4/1981 | European Pat. Off. | 360/104 |
| 0137559 | 10/1981 | Japan . | |
| 0070459 | 4/1983 | Japan . | |
| 0077056 | 5/1983 | Japan | 360/103 |
| 0215072 | 4/1984 | Japan . | |
| 0084386 | 5/1984 | Japan . | |

*Primary Examiner*—Robert S. Tupper
*Assistant Examiner*—Andrew L. Sniezek
*Attorney, Agent, or Firm*—Antonelli, Terry & Wands

[57] ABSTRACT

An actuator for a magnetic disk device causes movement of a magnetic head in the radial direction of a rotating magnetic disk. Although this magnetic head is floated above the magnetic disk by a stream of air induced by the rotation of the magnetic disk at a high speed, an excessively high velocity of the air stream causes excessive vibrations of a soft gimbal resiliently supporting the magnetic head. In the actuator of the present invention, a head arm supporting the magnetic head through the gimbal is formed with a wind-breaking projection preventing direct impingement of the air stream against the gimbal and magnetic head, thereby minimizing vibrations of the gimbal and magnetic head.

12 Claims, 5 Drawing Sheets

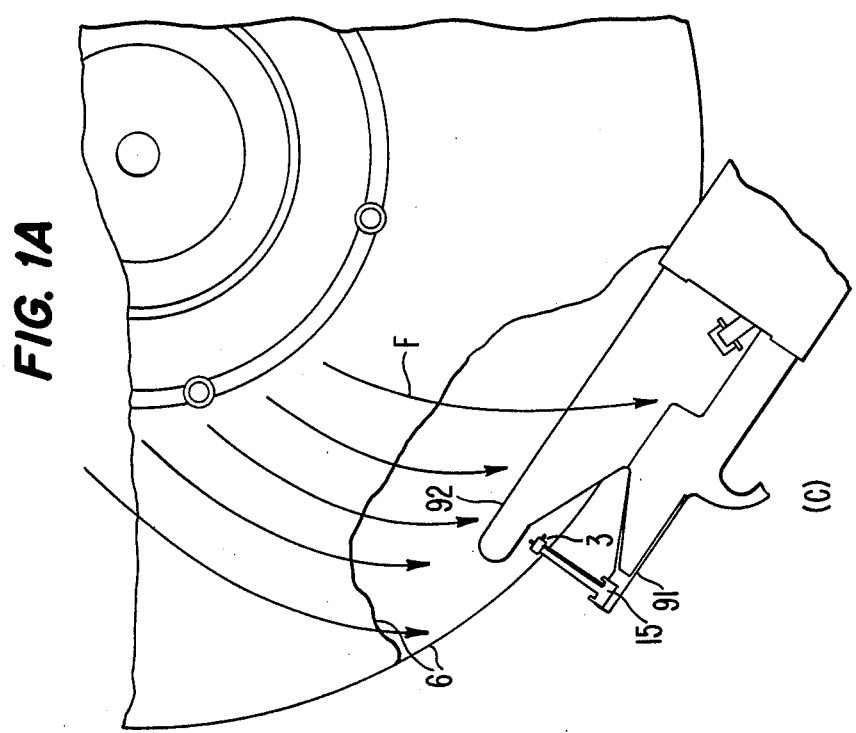

WIND BREAKING ASSEMBLY FOR A MAGNETIC HEAD

This application is a continuation of application Ser. No. 943,909, filed Dec. 19, 1986 now abondoned.

BACKGROUND OF THE INVENTION

This invention relates to an actuator for a magnetic disk devic, and more particularly to an actuator of the kind described above which is suitable for ensuring the stability of floating magnetic heads, improving the reliability of a signal recording and reproducing system and minimizing vibrations of the magnetic heads and magnetic disks.

An example of a prior art, magnetic disk device is shown in FIG. 5. Referring to FIG. 5, the prior art magnetic disk device includes a plurality of magnetic disks 6 mounted on a spindle 4 in a relation vertically spaced apart from each other by spacers, a spindle motor 9 rotating the magnetic disks 6 through a pulley 7 and a belt 8, a carriage 10 carrying magnetic head arms 1 supporting respective magnetic heads 3 (FIG. 4) thereon, a block 101 supporting the carriage 10 so as to be rotatable around a shaft, an actuator 11 positioning the magnetic heads 3, a base 12 supporting the actuator 11 thereon, cover 13 covering the parts described above to shield them from the exterior, and an annular filter 14 suspended from the cover 13 at a position directly above the center of rotation of the magnetic disks 6. The actuator 11 includes the carriage 10 and a voice coil motor 20 driving he actuator 11.

FIG. 4 shows the shape of the magnetic head arm 1. This magnetic head arm 1 is fixed to the carriage 10 by a head pin (not shown) extending through a hole A, and the magnetic head 3 is mounted through a gimbal 15 to a projection 91 formed at the front end of the magnetic head arm 1. The rotating movement of the carriage 10 causes a linear movement or a rocking movement of the magnetic head 3 above the recording surface of the associated magnetic disk 6. A signal is transmitted through a flexible printed circuit (FPC) 16 mounted on the surface of the magnetic head arm 1.

In such a magnetic disk device including magnetic head arms 1 each supporting a magnetic head 3 as described above, an improvement in the accuracy of head positioning becomes very important in view of the recent demand for an increased recording cpacity and an increased recording density. In order to meet the requirement for the improved accuracy of head positioning, various meand for preventing vibrations of the magnetic disks as well as vibrations of the magnetic heads have been proposed as described below.

(i) As an example, JP-A-59-84386 proposes a method of preventing vibrations of magnetic disks. According to the proposal, an internal shroud formed with many small perforations in its side walls surrounds magnetic disks to prevent turbulence of air flow. As another example, JP-A-56-137559 proposes a method of preventing vibrations of various parts of a magnetic disk device due to rotation of magnetic disks as well as vibrations of the magnetic disks. According to the proposal, a plurality of opposing sectoral spoilers communicating with the atmosphere are disposed above the recording surfaces of magnetic disks respectively to prevent the vbrations described above.

(ii) As a means for preventing vibrations of magnetic heads, JP-A-58-70459 proposes provision of baffle plates so as to prevent vibrations of gimbals supporting respective magnetic heads in a magnetic disk device. Also, in order to prevent vibrations of magnetic heads, JP-A-59-215072 proposes provision of a wind-shielding member in close proximity to the surface of a resilient support remote from the surface confronting a magnetic disk, thereby decreasing the amplitude of vibration of the resilient support and improving the effect of vibration damping.

However, even when prior art vibrations preventing or damping means as described above is applied, the prior art magnetic head arm 1 shown in FIG. 4, which is strongly affected by the stream and velocity of air flowing betwene the magnetic disks 6 rotating at a high speed, is swayed in the head positioning direction (the radial direction of the magnetic disks 6), and such a problem has arisen in which the magnetic head arm 1 together with the magnetic head gimbal 15 vibrates or resonates and the floating position of the magnetic head 3 is rendered unstable.

In order to ensure the stability of the floating position of the magnetic head 3, provision of spoilers fixedly disposed and extending linearly between the magnetic disks from the base has been proposed as described in (1) above. However, even when such spoilers are provided, difficulty has still been encountered in stably maintaining the floating position of the magnetic head 3 over the entire surface of the associated magnetic disk 6, since the condition with which the magnetic head 3 is exposed to wind, such as, the distance from the spoiler differs depending on the position of the magnetic head 3.

Due to the difficulty of stably maintaining the floating positin of the magnetic head 3, delicate displacement has occurred in the position of the magnetic head 3 carrying a servo head core for reading recorded informatin, especially, servo information, and a signal required for the head positioning control has been adversely affected.

Although attention has been directed to prevention of vibrations of the magnetic disks in the prior art, sufficient consideration has not been taken to prevent vibrations of the magnetic heads and magnetic head gimbals due to the direction and velocity or air flowing between the magnetic disks. Therefore, problems remain still in regard to the desired improvement in the head positioning accuracy and the required prevention of data destruction resulting from contact between a magnetic head and a magnetic disk due to the narrow spacing.

SUMMARY OF THE INVENTION

It is a first object of the present invention to provide an actuator for effecting movement of a magnetic head in the radial direction of a magnetic disk while floating the magnetic head above the recording surface of the magnetic disk, which actuator is provided with means for minimizing vibrations of the magnetic head and its gimbal due to the stream of air induced by the rotation of the associated magnetic disk.

A second object of the present invention is to provide an actuator of the type described above which is provided with means for preventing collision of the magnetic head with the magnetic disk.

The present invention which attains the above objects is featured by the fact that a head arm supporting the magnetic head is provided with a wind-breaking projection so that the magnetic head will not be directly exposed to the stream of air induced by the rotation of the magnetic disk.

BRIEF DESCRIPTION OF THE DRAWINGS

FIG. 1A is a view similar to FIG. 1 showing also wind flow arrows (F).

DESCRIPTION OF THE PREFERRED EMBODIMENTS

A preferred embodiment of the present invention will now be described in detail with reference to the drawings.

Figure 1:
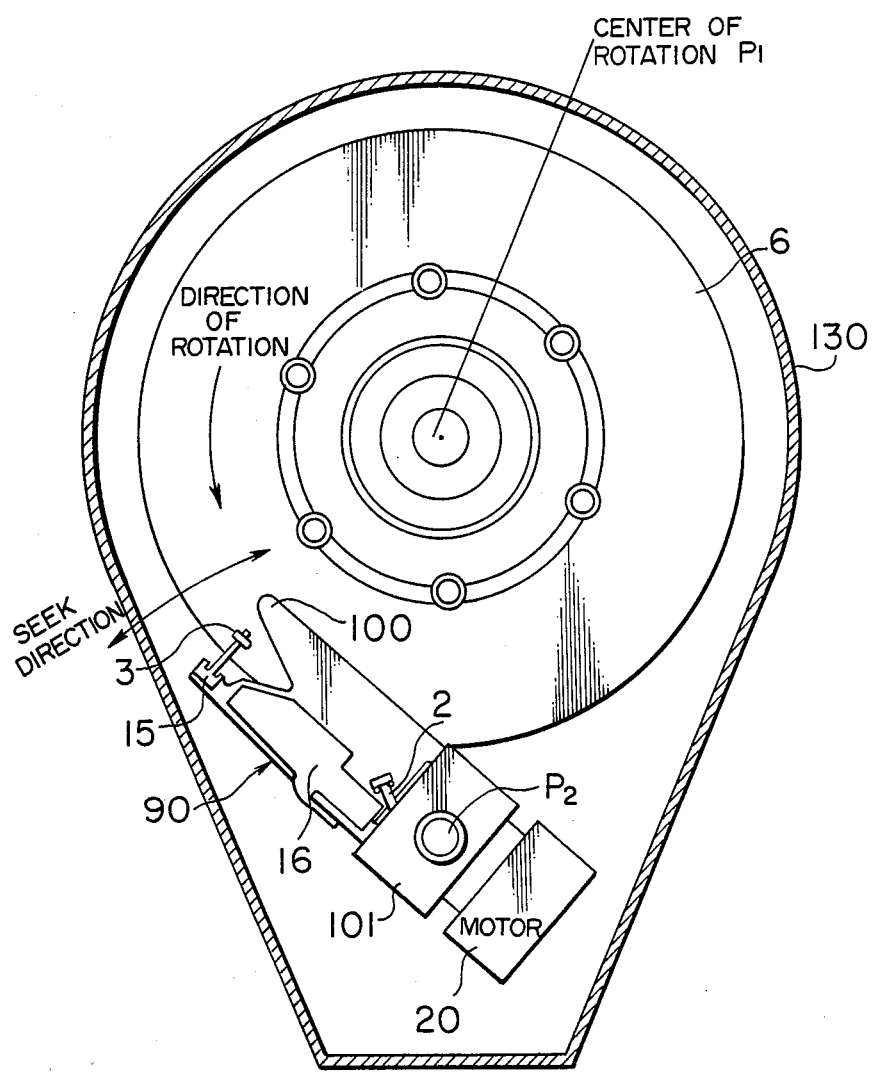
FIG. 1 is a plan view of a magnetic disk device provided with a preferred embodiment of the actuator according to the present invention.
Figure 2:
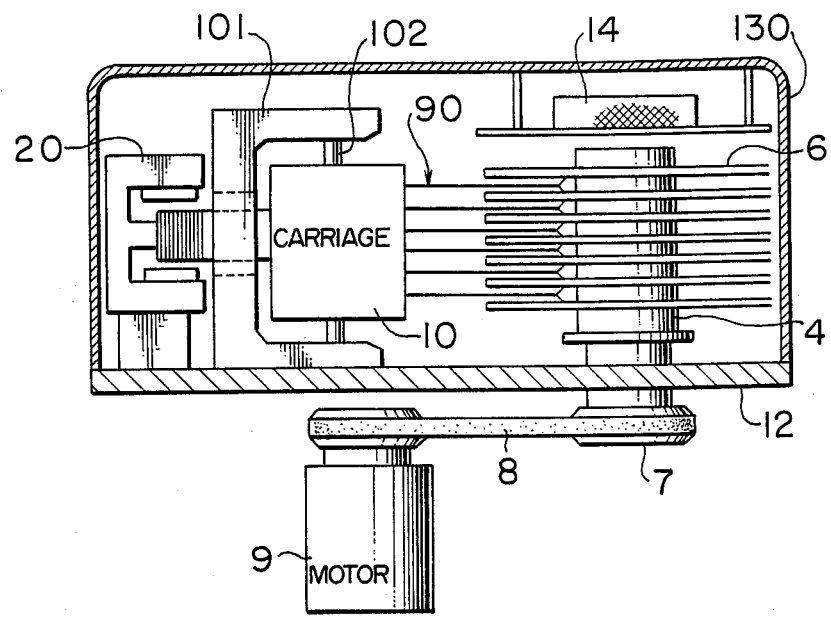
FIG. 2 is a schematic vertical sectional view of the magnetic disk device shown in FIG. 1.

FIG. 1 is a partly sectional, plan view of a magnetic disk device using an embodiment of the actuator according to the present invention, and FIG. 2 is a vertical sectional view of the magnetic disk device shown in FIG. 1. The magnetic disk device shown in FIGS. 1 and 2 includes a plurality of magnetic disks 6 mounted on a spindle 4 in a relation vertically spaced apart from each other by spacers, a spindle motor 9 rotating the magnetic disks 6 through a pulley 7 and a belt 8, a plurality of head arms 90 each supporting a magnetic head 3 through a gimbal 15, a carriage 10 having the head arms 90 coupled thereto by head pins 2, a block 101 supporting the carriage 10 so as to be rotatable around a shaft 102, a voice coil motor 20 causing rotation of the carriage 10 around the shaft 102, a base 12, a cover 13, and an annular filter 14. The head arms 90, carriage 10, block 101 and voice coil motor 20 constitute an actuator. The basic structure of such an actuator is described in U.S. Pat. Application Ser. No. 541,441. The diameter of the magnetic disks 6 is about 14 inches (about 35.56 cm).

In the magnetic disk device having such a structure, each of the magnetic heads 3 is moved in a floating manner in the radial direction of the associated magnetic disk 6 rotating at a high speed, thereby recording and reproducing data on and from the magnetic disk 6.

The actuator embodying the present invention is featured by the shape of the magnetic head arm 90. The magnetic head arm 90 incorporated in the actuator embodying the present invention has a shape as shown in FIG. 3.

Figure 3:
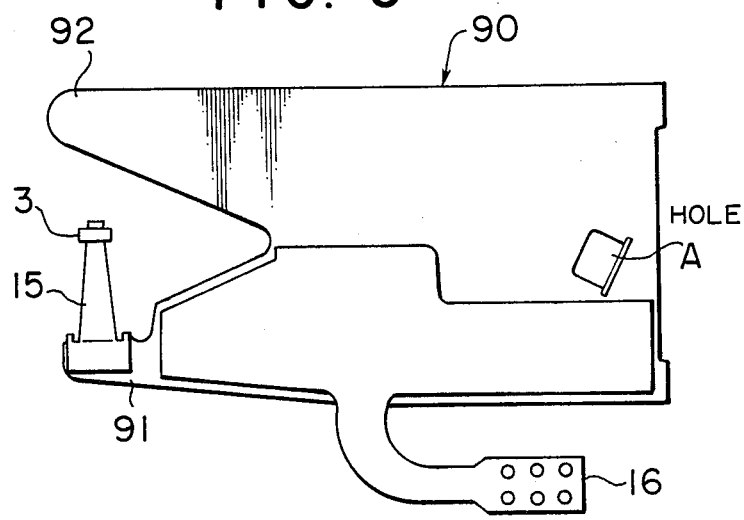
FIG. 3 shows a magnetic head arm incorporated in the embodiment of the actuator of the present invention shown in FIG. 1.
Figure 4:
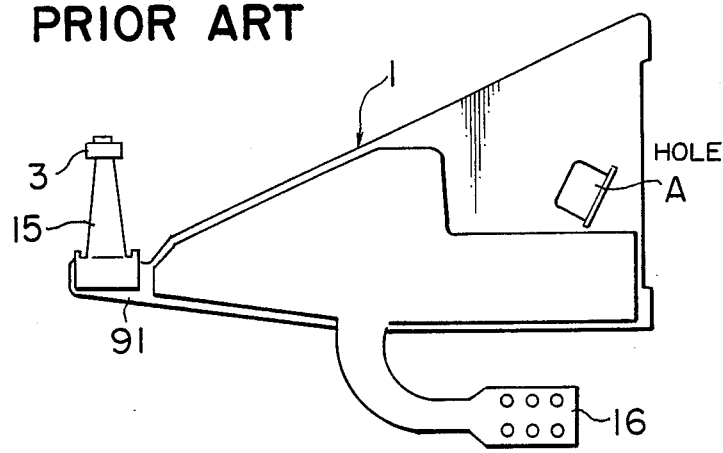
FIG. 4 shows an example of a prior art head arm.
Figure 5:
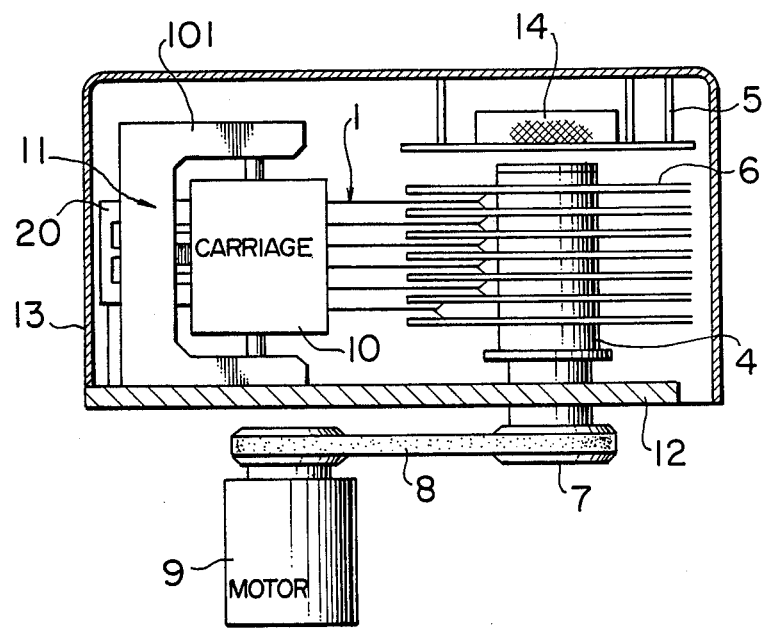
FIG. 5 is a schematic vertical sectional view of a prior art magnetic disk device.

When compared to the prior art head arm 1 shown in FIG. 4, the head arm 90 shown in FIG. 3 is featured by the fact that, in addition to the projection 91 on which the magnetic head 3 is supported through the gimbal 15, another projection 92 for wind breaking purpose is formed at a radially inner position above the magnetic disk 6 relative to the position of the magnetic head 3. That is, the magnetic head arm 90 incorporated in the actuator embodying the present invention includes the projection 91 supporting the magnetic head 3 through the gimbal 15, the wind-breaking projection 92 projecting inwardly in the radial direction of the magnetic disk 6 relative to the position of the magnetic head 3, an FPC 16 connected to the magnetic head 3, and a hole A for mounting the magnetic head arm 90 to the carriage 10.

When the magnetic head arm 90 having such a structure is incorporated in the magnetic disk device and is moved in the radial direction of the associated magnetic disk 6, the stream of air as illustrated by arrows (F) in FIG. 1A induced by the rotation of the magnetic disk 6 impinges against and is blocked by the wind-breaking projection 92 regardless of wheather the magnetic head 3 is located at a radially inner position or a radially outer position above the magnetic disk 6. Therefore, regardless of the radially inner or outer location of the magnetic head 3 relative to the magnetic disk 6, the stream of air impinging against the magnetic head 3 and gimbal 15 is weakened so that unddesirable vibrations or resonance of the gimbal 15 and magnetic head 3 due to impingement of the steam of air can be minimized. Thus, ojbectionable head crash (collision of the magnetic head 3 against the magnetic disk 6) can be prevented.

Figure 6:
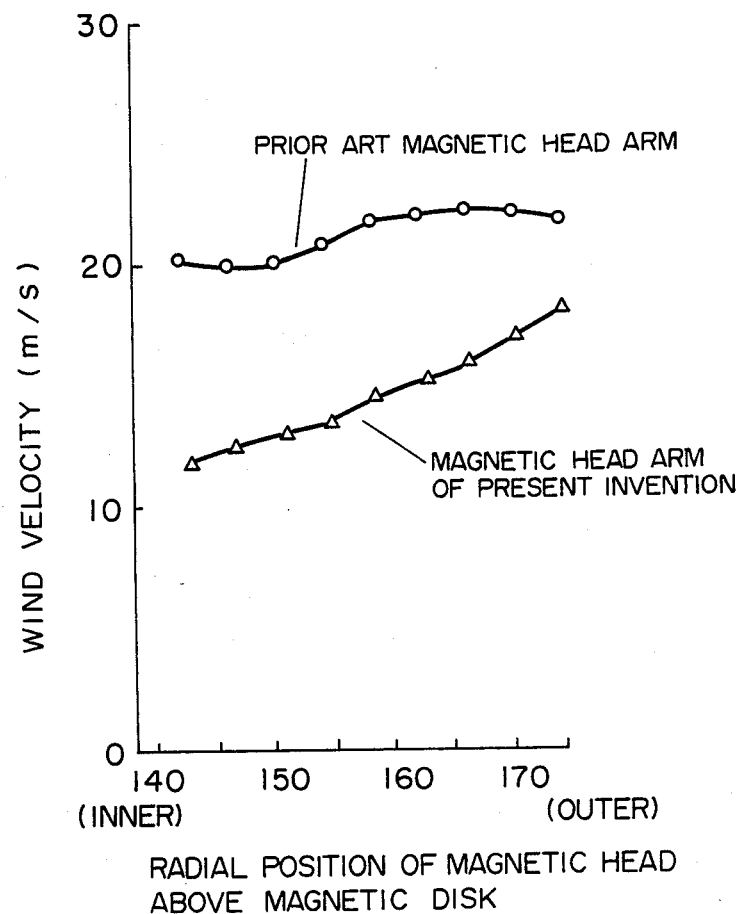
FIG. 6 is a graph showing the relation between the radial position of the magnetic head and the velocity of wind to which the head slider is exposed when the head arm of the present invention shown in FIG. 3 and the prior art head arm shown in FIG. 4 are actually mounted.

FIG. 6 is a graph showing the relation between the velocity of wind impinging against the slider when the prior art head arm shown inFIG. 4 is used and the velocity of wind impinging against the slider when the head arm of the present invention shown in FIG. 3 is used. In FIG. 6, the verticl axis represents the the radial position of the magnetic head above the magnetic disk. It will be apparent from reference to FIG. 6 that, in the case of the prior art head arm, the velocity of wind to which the head slider is exposed between the radially inner and radially outer positions of the magnetic head is about 20 m/s, whereas, in the case of the head arm incorporated inthe embodiment of the present invention, the velocity of wind is lower or about 11 to 18 m/s although it increases progressively as the magnetic head is moved from the radially inner position toward the radially outer position above the magnetic disk. Especially, in the case of the embodiment of the present invention, the diameter of the magnetic disk 6 is as large as about 14 inches (about 35.56 cm), and the velocity of wind induced by the rotation of the magnetic disk is correspondingly high. Therefore, the present invention is effective from this point too.

It will be understood from the foregoing detailed description of the present invention that a wind-breaking projection is formed as part of a magnetic head arm at a position closer to the center of rotation of a magnetic disk rotation at a high speed than the position of a magnetic head floating above the recording surface of the magnetic disk, for preventing wind induced by the rotation of the magnetic disk from impinging against the slider and for decreasing the velocity of wind. Thus, the wind-breaking member 92 is effective to prevent a stream of air induced by the rotation of the magnetic disk from directly impinging against the magnetic head 3 at whatever position the magnetic head has above the recording surface of the magnetic disk. Therefore, the present invention is effective in preventing a head positioning error due to vibrations of the magnetic head arm and magnetic head gimbal, thereby optimizing the floating position of the magnetic head. Thus, the prior art head positioning accuracy, which was about 1 $\mu$m, can be improved to about 0.5 $\mu$m.

In terms of the vibration level, the present invention exhibits a very great effect in a vibration frequency range between 2.0 KHz and 3.0 KHz exceeding an allowable vibration limit.

The embodiment of the present invention has referred to am actuator of rotary type which causes rotary shifting movement of magnetic heads. However, the present invention is in no way limited to such a specific embodiment and is also applicable to an actuator of linear type which urges magnetic heads in the radial direction of magnetic disks. As disclosed in, for example, U.S. Pat. No. 4,415,941, such a linear actuator comprises a plurality of guide rails extending in the radial direction of magnetic disks, a carriage supporting magnetic heads through gimbals at one end thereof and having a plurality of rollers engaging with the guide rails, and a voice coil motor causing the carriage to travel in a linear direction along the guide rails. In the application of th present invention to such a linear actuator, the wind-breaking projection according to the present invention is preferably disposed on the windward side of the magnetic heads.

We claim:

1. An actuator for a magnetic disk device comprising:
   a plurality of magnetic disks
   a plurality of riged head arms having a predetermined length between two ends, one end of each being fixed to a carriage;
   a plurality of resilient gimbals each having one end fixed to the other end of a corresponding head arm;
   a plurlityof magnetic heads, each supported on another end of said respective gimbal;
   a drive source for driving said carriage so that the magnetic heads are moved in a radial direction of said magnetic disks;
   each of said head arms comprising first and second branching portions;
   said first and second branching portions being unitary parts of a plate-shaped member having a surface which is parallel to the surfaces of the magnetic disks;
   said first branching portion supporting one or said plurality of magnetic heads through one of said gimbals so as to position said magnetic head above a recording surface of a magnetic diskf and
   said second branching portion extending toward the axis of rotation of said magnetic disks to a position that is radially inside of the position of said first branching portion above the recording surface of said magnetic disk and disposed on a windward side of the magnetic head supported by said first portion.

2. An actuator for a magnetic disk device according to claim 1 wherein
   the branching portions of the head arms have upper and lower surfaces that are co-planar and said drive source is a voice coil motor.

3. An actuator according to claim 2, wherein said carriage is mounted for rotation about an axis that is parallel to said magnetic disk rotation axis, and said voice coil motor is of a rotary type for causing rotation of said carriage.

4. An actuator according to claim 2, wherein said carriage is supported to be linearly movable on guide rails extending linearly in the radial direction toward the rotation axis of said magnetic disks, and said voice coil motor is of a linear type for causing linear reciprocating movement of said carriage along said guide rails.

5. An actuator according to claim 3, wherein the diameter of said magnetic disks is about 14 inches.

6. An actuator according to claim 1 wherein the direction of the longitudinal dimensiion of said second portion is angled relative to the longitudinal dimension of said gimbal; and wherein said second portion extends to a position that iss between the magnetic head and the axis of rotation at all positions of th magnetic head when in operative engagement with said magnetic disk.

7. An actuator according to claim 2, wherein said first portion supports one magnetic head driven by said drive source.

8. An actuator for a magnetic disk devide comprising:
   a stack of magnetic disks having facing surfaces mounted for rotation about a single axis in a direction at a rotational velocity which creates a windflow;
   a carriage for supporting a plurality of head arms which are rigid and have a predetermined length;
   a plurality of resilient gimbals each having a predetermined length between two ends with one end attached to one of said head arms in a directin perpendicular to a longitudinal direction of said respective head arm and with the other end having a magnetic head fixed thereto;
   a voice coil motor driving said head arms in a direction toward the axis of rotation and in spaces between said magnetic disks;
   each of said head arms having a wind-breaking member located on a side of said gimbal facing said windflow at a position that is between the magnetic head and the axis of rotation;
   said wind-breaking member having a shape of a plate that is parallel to said magnetic disks; and coplanar with said respective head arm;
   said wind-breaking member having a portion that is spaced from and extends ahead of the position of the magnetic head with regard to the direction of rotation of said magnetic disk; and
   said wind-breaking member being above a recording surface of one of said magnetic disks and positioned to prevent a stream of air induced by the rotation of said magnetic disks and directed toward the periphery of the disks due to centrifugal force on the air between the adjacent rotating disks from directly impinging against said magnetic head above a recording surface of one said magnetic disks.

9. An actuator according to claim 8, wherein the portion of the wind-breaking member that extends ahead of the position of the magnetic head lies along a radial line extending from the axis of rotation that is ahead of the radial line passing through said magnetic head with regard to the direction of rotation of the magnetic disk.

10. An actuator for a magnetic disk device having a stack of magnetic disks having facing parallel surfaced mounted for rotation about an axis at a vlocity sufficient to create wind flow in spaces between adjacent disks in a directin toward the periphery of the disks due to centrifugal force, said actuator comprising:
   a plurality of rigid plate-shaped head arms each supporting a magnetic head through a resilient gimbal, said head being positioned in a space between adjacent disks of said stack;
   a drive source including a carriage for controlling movement of said head arms in a radial direction of said magnetic disks;

each of said head arms comprising first and second branching portions having upper and lower surfaces lying substantially in parallel planes that are parallel to said magnetic disk surfaces;

said first branching portion supporting said magnetic head through said gimbal and supporting a flexible print circuit for transferring signals to be written or read between said magnetic head and said respective magnetic disk;

said second branching portion being spaced from and not supporting a magnetic head; and said second portion including an end region separated by a space from said magnetic head an coplanor with said first branching portion and extending to a position radially inwardly of the position of the magnetic head carried by said first portion and forwardly of the position of said magnetic head with regard to the direction of rotation of the rotating disks to be upstream in a path in wind flow directed against said magnetic head and serve as a wind-break that is effective to reduce vibration of the magnetic heads and disks.

11. An actuator according to claim 10, wherein the region of the wind-breaking member that extends ahead of the position of the magnetic head lies along a radial line from the axis of rotation that is ahead of the radial line passing through said magnetic head with regard to the directions of rotation of the magnetic disk.

12. An actuator for a magnetic disk device having a stack of magnetic disks having facing parallel surfaces mounted for rotation about an axis at a velocity sufficient to create wind flow in spaced between adjacent disks in a direction toward the periphery of the disks due to centrifugal force, said actuator comprising:

a carriage rotatably mounted about an axis;

a plurality of rigid plate-shaped head arms having a predetermined length between two ends, one end of each of which is fixed to a carriage;

a plurality of resilient gimbals having a predetermined length between two ends with one end fixed to the other end of a head arm, the length dimension beind disposed so as to be in a directio substantially perpendiclar to a length direction of the head arm;

a magnetic head fixed to the other end of each of said gimbals;

a drive source for rotating said carriage so that the magnetic heads are moved in a substantially radial direction of said magnetic disks to write information in or read information from said magnetic disks;

each of said head arms comprising first and second branching portions and a common plate shaped portion;

said first branching portion supporting said gimbal substantially at its one end portion, said second branching portion not supporting a magnetic head, said first and second branching portions being formed as integral parts of said plate-shaped head arm;

a flexible print circuit for transferring read or write information from or to said magnetic head and being attached on said first branching portion and said common portion; and said second branching portion being complanar with said first branching portion and having a free end region which extends to a position radially inwardly of the position of the magnetic head carried by said first portion and forwardly of the position of said magnetic head with regard to the direction of rotation of the rotating disks to be upstream in a path of wind flow directed against said magnetic head and to serve as a windbreaking member, and the free end region of the wind-breaking member that extends ahead of the position of the magnetic head lies along a radial line from the axis of rotation that is ahead of a radial line passing through said magnetic head with regard to the direction of rotation of the magnetic disk.

* * * * *